(12) United States Patent
Christensen et al.

(10) Patent No.: US 11,607,905 B2
(45) Date of Patent: Mar. 21, 2023

(54) WHEEL ASSEMBLIES FOR MODEL VEHICLES

(71) Applicant: TRAXXAS LP, McKinney, TX (US)

(72) Inventors: Casey Christen Jens Christensen, McKinney, TX (US); Jory Sprowl, Honey Grove, TX (US); Otto Karl Allmendinger, Rowlett, TX (US)

(73) Assignee: TRAXXAS, L.P., McKinney, TX (US)

( * ) Notice: Subject to any disclaimer, the term of this patent is extended or adjusted under 35 U.S.C. 154(b) by 446 days.

(21) Appl. No.: 16/778,901

(22) Filed: Jan. 31, 2020

(65) Prior Publication Data

US 2020/0247179 A1    Aug. 6, 2020

Related U.S. Application Data

(60) Provisional application No. 62/799,607, filed on Jan. 31, 2019.

(51) Int. Cl.
| | |
|---|---|
| *B60B 7/04* | (2006.01) |
| *B60B 7/01* | (2006.01) |
| *B60B 7/06* | (2006.01) |
| *B60B 7/14* | (2006.01) |
| *B60B 7/00* | (2006.01) |
| *A63H 17/26* | (2006.01) |
| *A63H 30/04* | (2006.01) |

(52) U.S. Cl.
CPC ............ *B60B 7/04* (2013.01); *A63H 17/262* (2013.01); *A63H 30/04* (2013.01); *B60B 7/0013* (2013.01); *B60B 7/01* (2013.01); *B60B 7/063* (2013.01); *B60B 7/14* (2013.01); *B60B 2310/204* (2013.01); *B60B 2310/318* (2013.01); *B60B 2360/32* (2013.01); *B60B 2900/572* (2013.01)

(58) Field of Classification Search
CPC .......... B60B 7/04; B60B 7/0013; B60B 7/01; B60B 7/063; B60B 7/14; B60B 2310/204; B60B 2310/318; B60B 2360/32; B60B 2900/572; A63H 17/262; A63H 30/04
See application file for complete search history.

(56) References Cited

U.S. PATENT DOCUMENTS 4,295,685 A * 10/1981 Spisak ...................... B60B 7/04
                                                          301/108.3
5,820,225 A * 10/1998 Ferriss .................... B60B 7/063
                                                          301/37.11

(Continued)

FOREIGN PATENT DOCUMENTS

WO    WO-2012022911 A1 *  2/2012  ............. B60B 3/145
WO    WO-2013034711 A1 *  3/2013  ............... B60B 7/01

*Primary Examiner* — Jacob B Meyer
(74) *Attorney, Agent, or Firm* — Daryl R. Wright; Greg Carr

(57) ABSTRACT

A wheel assembly for a model vehicle is provided. The wheel assembly may include a wheel base configured for mounting an R/C vehicle tire and a colored trim piece provided on a facing surface of the wheel base. In addition, the wheel assembly may include a wheel face configured to allow portions of the colored trim piece to be visible when the wheel face is attached to the wheel base. The wheel assembly may also include a hub cap assembly that comprises a hub cap and a retainer. Wherein the hub cap assembly is removably secured against the wheel base via the retainer.

17 Claims, 8 Drawing Sheets

(56) References Cited

U.S. PATENT DOCUMENTS

| | | | | |
|---|---|---|---|---|
| 6,200,411 B1* | 3/2001 | Eikhoff | ............... | B60B 7/008 |
| | | | | 301/37.43 |
| 6,609,763 B1* | 8/2003 | Kinstler | ............... | B60B 7/063 |
| | | | | 301/37.31 |
| 6,779,852 B2* | 8/2004 | Van Houten | ............ | B60B 7/006 |
| | | | | 301/37.11 |
| 7,669,940 B2* | 3/2010 | Diko | ............... | B60B 7/14 |
| | | | | 301/37.371 |
| 8,020,945 B2* | 9/2011 | Takeda | ............... | B60B 7/14 |
| | | | | 301/37.108 |
| 8,162,406 B2* | 4/2012 | Heck | ............... | B60B 7/04 |
| | | | | 301/37.11 |
| 11,325,416 B2* | 5/2022 | Van Houten | ............ | B60B 5/02 |
| 2002/0093242 A1* | 7/2002 | Chase | ............... | B60B 7/04 |
| | | | | 301/37.43 |
| 2002/0153763 A1* | 10/2002 | Van Houten | ............ | B60B 7/01 |
| | | | | 301/37.43 |
| 2010/0181821 A1* | 7/2010 | Noriega | ............... | B60B 7/0013 |
| | | | | 301/37.35 |
| 2010/0231030 A1* | 9/2010 | Eaton | ............... | A63H 17/262 |
| | | | | 301/53.5 |
| 2019/0184735 A1* | 6/2019 | Van Houten | ............ | B60B 7/065 |
| 2020/0247179 A1* | 8/2020 | Christensen | ............ | A63H 30/04 |

* cited by examiner

ND VEHICLES

BACKGROUND

The following descriptions and examples are not admitted to be prior art by virtue of their inclusion in this section.

Radio Controlled (R/C) vehicles, controlled through a radio link such as R/C Cars, R/C Planes, R/C Trucks, and R/C Boats, among others, have greatly evolved due to advances in technology, chemistry, and computer science. In the case of R/C vehicles that are cars or trucks, some R/C vehicles are designed to look and function like a real world, full sized counterpart. As a result, manufacturers continue to focus on duplicating the look, colors, and features of a full size vehicle in a smaller scale. In some cases, details such as wheels for a R/C vehicle will duplicate the mounting nuts, emblems, and colors in addition to the overall look of the wheel.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An embodiment of the claimed disclosure may comprise a wheel assembly for an R/C vehicle that includes a wheel base configured for mounting an R/C vehicle tire and a colored trim piece provided on a facing surface of the wheel base. In addition, the wheel assembly may further include a wheel face configured to allow portions of the colored trim piece to be visible when the wheel face is attached to the wheel base.

Another embodiment of the current disclosure may comprise a wheel assembly for an R/C vehicle that includes a wheel base configured to mount an R/C vehicle tire. The wheel base may comprise a colored trim portion on a facing surface of the wheel base. The wheel assembly may further include a wheel face configured to allow portions of the colored trim piece to be visible when the wheel face is attached to the wheel base. Wherein the colored trim portion is due to the wheel base being molded in a different color than the wheel face.

A further embodiment of the current disclosure may comprise a wheel assembly for an R/C vehicle that includes a wheel base configured for mounting an R/C vehicle tire and a colored trim piece provided on a facing surface of the wheel base. In addition, the wheel assembly may include a wheel face configured to allow portions of the colored trim piece to be visible when the wheel face is attached to the wheel base. The wheel assembly may also include a hub cap assembly that comprises a hub cap and a retainer. Wherein the hub cap assembly is removably secured against the wheel base via the retainer.

Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment.

R/C vehicle wheels are one of the many components making up a scale version of full sized automobile or truck. However, when the scale of a full sized vehicle is reduce to $\frac{1}{10}$ or $\frac{1}{16}$ scale, many features become difficult or impossible to accurately recreate. Previously, manufacturers have encountered difficulty adding an accent color in a very thin or minute ring around the facing surface of a miniature wheel rim. Painting would require the use of a very fine brush or mask and the results often lacked the detail or precision desired by the model manufacturers. In addition, if a user wanted to change the color to match the vehicle body, a new set of rims had to be purchased or the existing accent ring painted over. In some cases, the accent ring could be damage or scraped if provided on the surface of a wheel assembly.

Figure 1:
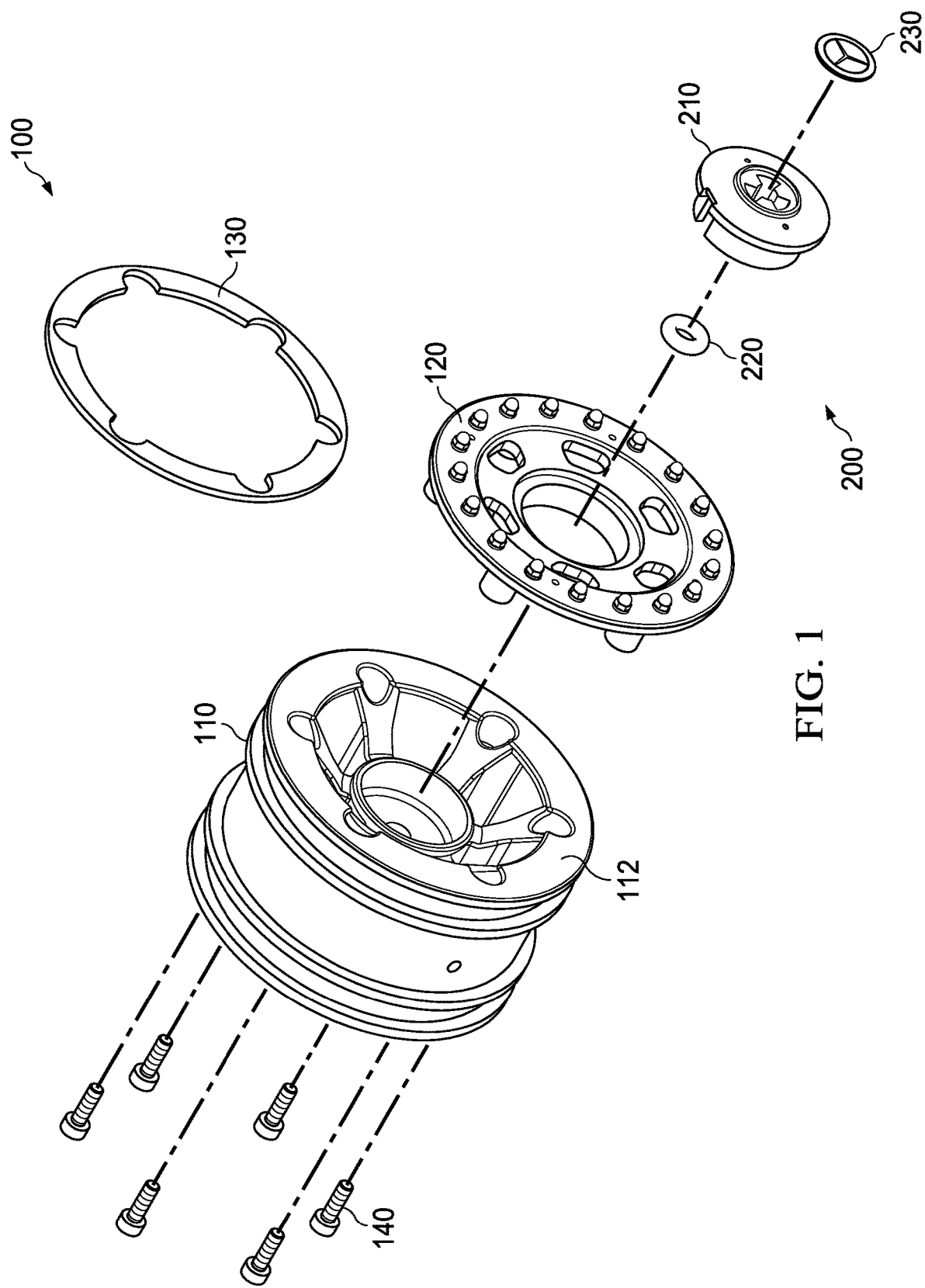
FIG. 1 is an exploded assembly diagram showing a wheel assembly according to an embodiment of the disclosure.

Referring generally to FIG. 1, an exemplary embodiment of a wheel assembly 100 for an R/C vehicle is shown. In this figure, a wheel base 110, wheel face 120, colored trim piece 130, and mounting mechanisms 140 are displayed along with a hub cap assembly 200. In the hub cap assembly 200, there is the hub cap 210, retainer 220, and center cover 230.

Some embodiments of the wheel base 110 may have a colored surface 112 that will form the accent ring. The colored surface 112 may be painted or impregnated into the plastic. In some embodiments, a separate colored trim piece 130 may be overlayed or attached to the wheel base 110. A plastic trim ring is shown for the colored trim piece 130 but a vinyl sticker or other such piece may be used. The colored trim piece 130 may be adhered to the wheel base 110 or retained between the clamping action of the wheel base 110 and the wheel face 120.

Use of a colored trim piece 130 instead of, or in addition to permanently colored surface 112, may allow a user to readily change out the color of a wheel's accent ring to match a different body color or other accented components. In addition, if the colored trim piece 130 is color impregnated throughout, then there is a degree of protection against damage due to heavy use of the wheel assembly 100 in an off road environment.

If a separate colored trim piece 130 is used, then the wheel face 120 may hold the colored trim piece 130 in place against the wheel base 110 through the use of an attachment mechanism 140. In this embodiment, six (6) screws are shown that attached to one side of the wheel face 120 via the wheel base 110 and hold the wheel face 120 against the wheel base 110. As stated previously, a separate colored trim piece 130 or a colored surface of the wheel base 110 may be provided between, and held by, the wheel face 120 and wheel base 110. In this embodiment, the wheel face 120 is styled as a bead locking rim common to off-road vehicles.

Although, screws are shown in this embodiment in order to allow the wheel face 120 to be removably secured to the wheel base 110, other embodiments may have the wheel face 120 held in position on the wheel base 110 via a snap fit attachment mechanism, for example. In the current figure, the attachment mechanisms 140 are provided through the back or inside (relative to the vehicle) of the wheel base 110 and secure to the back or inside (relative to the vehicle) of the wheel face 120.

In addition, a hub cap assembly 200 is shown. In the hub cap assembly 200, there is a hub cap 200, retainer 220, and a center cover 230. The hub cap assembly 200 functions to cover the center of the wheel assembly 100 and obscure and/or protect the mounting nut (not shown in this figure) securing the wheel assembly 100 to an R/C vehicle. The hub cap assembly 200 will be described in more detail later in this disclosure.

Figure 2:
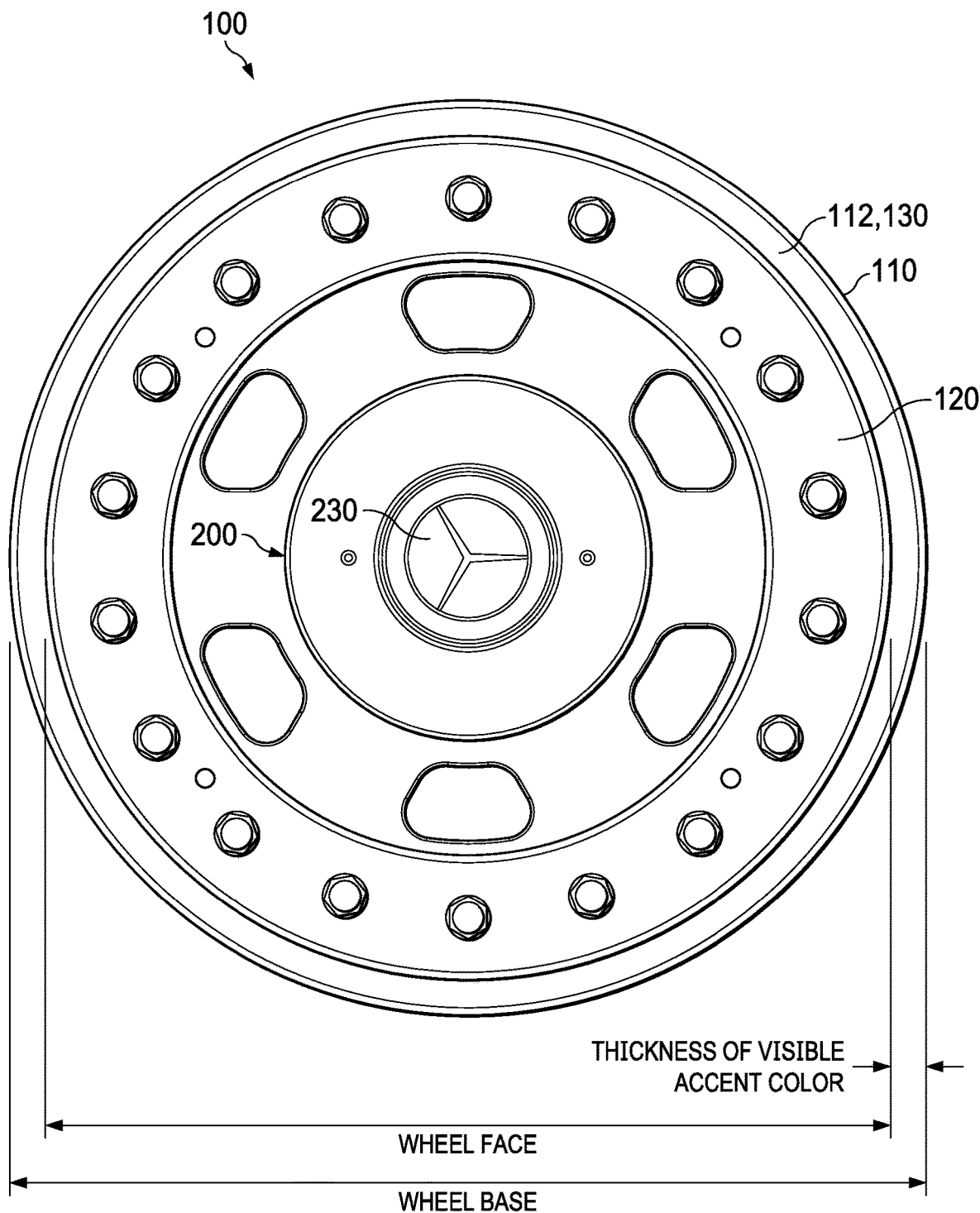
FIG. 2 is an elevated side view showing an assembled wheel assembly according to an embodiment of the disclosure.

Referring to FIG. 2, a fully assembled wheel assembly 100 is shown in a front view. In this figure, the outer circumference of the wheel face 120 is less than the outer circumference of the wheel base 110. The difference in circumferences produces a visible accent ring showing either a colored surface 112 of the wheel base 110 or the colored surface of a colored trim piece 130.

Figure 3:
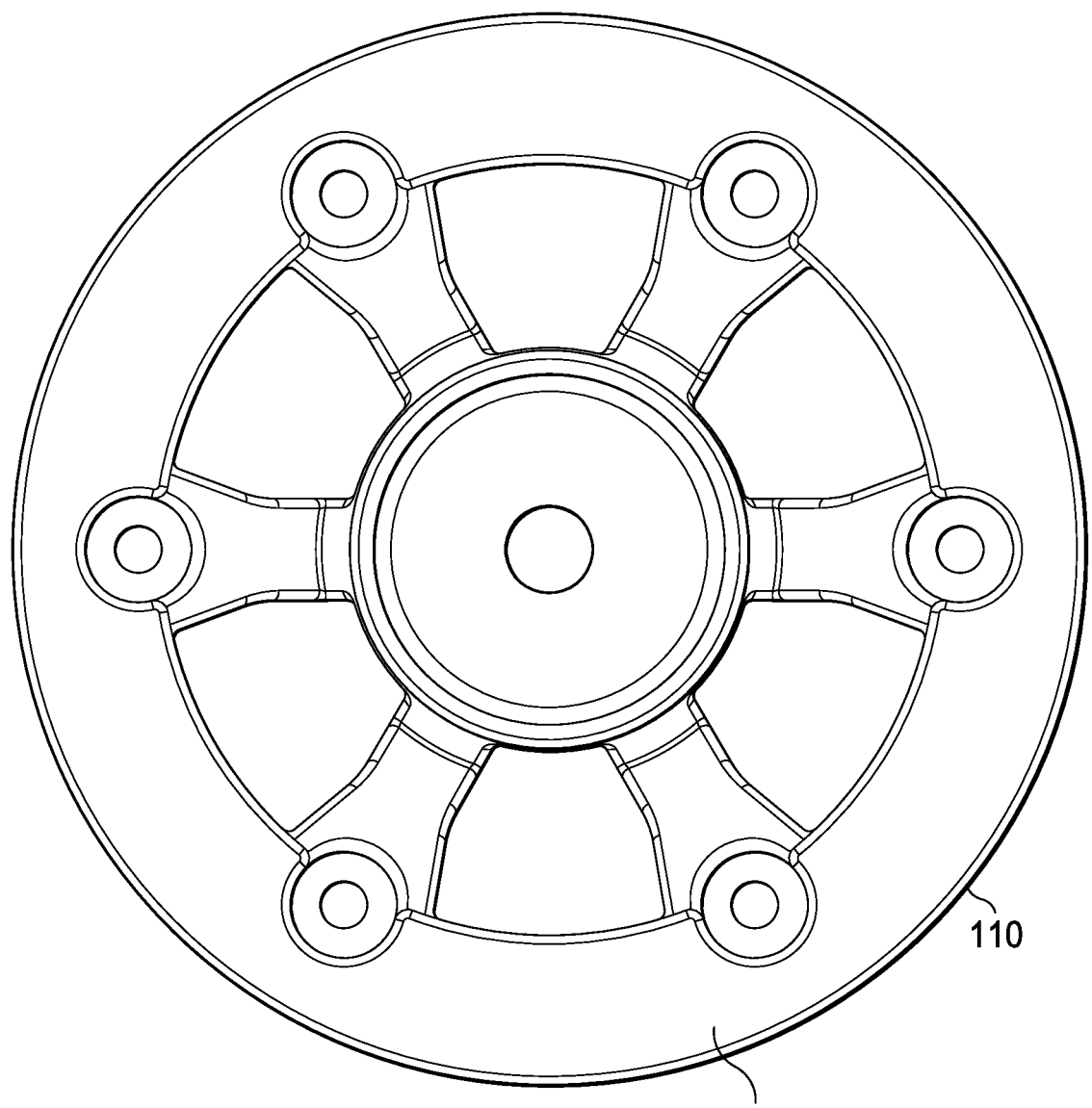
FIG. 3 is an elevated side view showing a color portion of a wheel base, according to an embodiment of the disclosure.

Referring generally to FIG. 3, in some embodiments, the colored surface 112 of the wheel base 110 may be painted or overlaid with a graphic trim piece, such as an adhesive vinyl sheet containing a desired surface treatment such as a color or color combination, or even graphic design, as desired. In some cases, the surface treatment may be a camouflage effect, in others, a surface resembling carbon fiber for example. In other embodiments, the colored trim piece 130 may perform this function. Of course, in still other embodiments, the entire wheel base 110 may also be formed of color impregnated material or even color changing material, depending upon the desired effect.

Attached to the wheel base 110 and covering at least a portion of the color portion is a wheel face 120. The wheel face 120 may permit parts of the color portion 112, 130 of the wheel base 110 to be visible after the wheel assembly 100 is completed. In FIG. 2, it is the difference in diameters between the wheel face 120 and the wheel base 110 that results in a visible ring of color once the wheel face 120 is attached to the wheel base 110. However, other accent shapes may also be provided.

Figure 5:
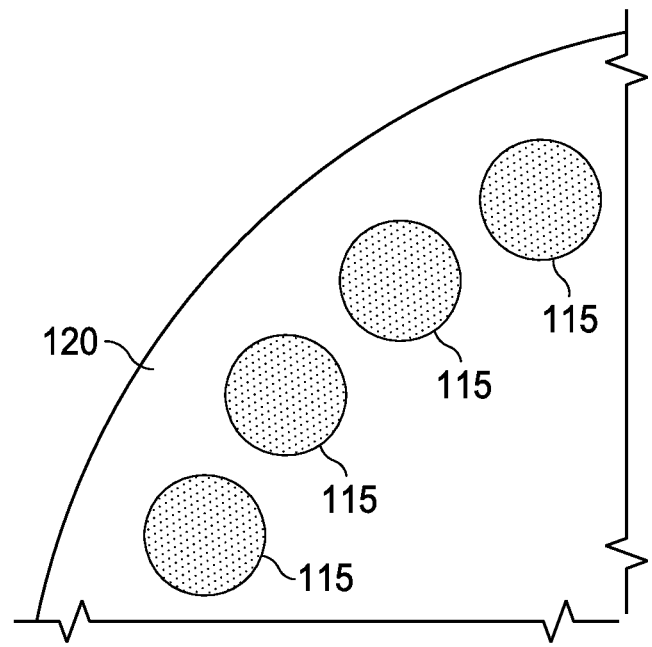
FIG. 5 is a showing of a configuration of a partial portion of a wheel face in which a color portion is visible via the wheel face, according to an embodiment of the disclosure.

Referring to FIG. 5, two variations of the wheel face 120 are shown as non-limiting examples. Since the visible portion of the colored surface 112 or colored trim piece 130 of the wheel base 110 is defined in part by the configuration of the wheel face 120, various patterns and designs may be possible. As shown in the figure, slots 114, holes 115, or other shapes (not shown) such as diamonds, squares, outlines of objects, among others, may provide a customizing color accent to a wheel assembly 100.

Figure 4:
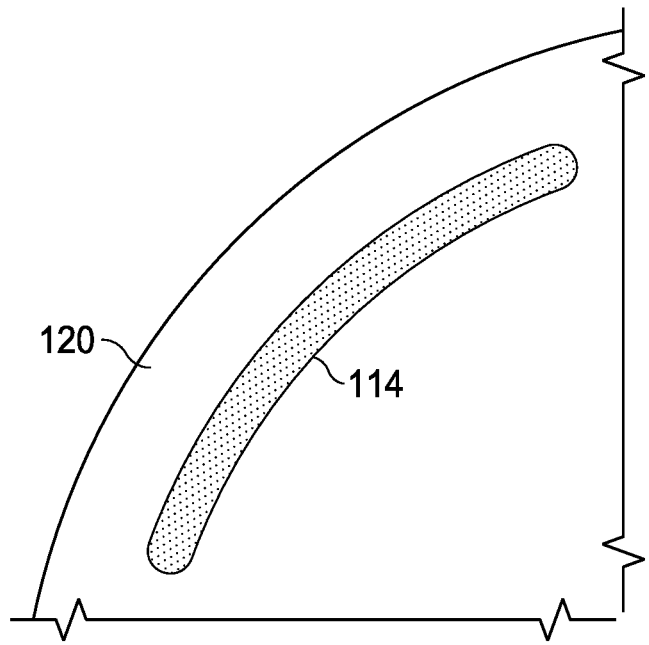
FIG. 4 is a showing of a configuration of a partial portion of a wheel face in which a color portion is visible via the wheel face, according to an embodiment of the disclosure.

As shown in FIGS. 4 and 5, in FIG. 4, a series of thin lines 114 or accent lines may be formed at various locations in the wheel face 120, resulting in accents to circumference. While these figures show shapes surrounding or along the circumference of the wheel face 120, teachings of this disclosure may be applied as wheel spokes, or to other areas of the wheel assembly 100 as desired or appropriate. Again, since the visible color portion of the wheel base 110 is due to the configuration of the wheel face 120, precise accent lines or features may be molded into the wheel face 120 to show detailed features without the corresponding requirements for precision in applying color to the wheel assembly 100.

Although a circumferential trim ring and various accent marks have generally been shown as thin lines, a person of skill in the art could apply the teachings of this disclosure to a variety of geometric shapes and configurations. For example, in FIG. 5, a series of circular orifices 115 are shown in the wheel face 120 to allow the visible portion of the color portion 112, 130 of the wheel base 110 to appear. In addition, but not limited to, a variety of complex combinations of geometries may be used, allowing for ways to customize and personalize a user's R/C vehicle, without requiring the purchase of new wheel assemblies 100.

Figure 6:
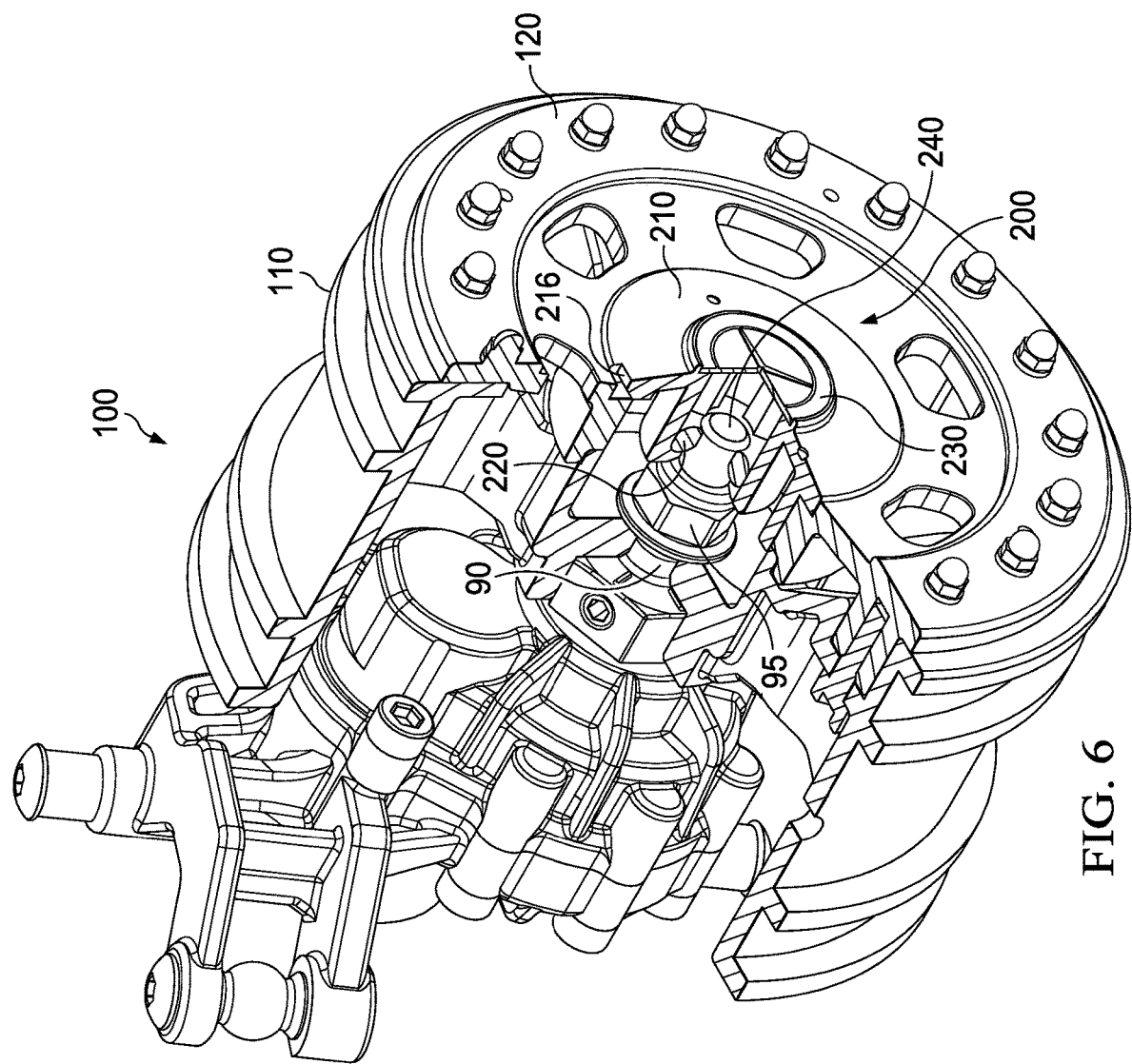
FIG. 6 is a partial sectional view showing a wheel assembly attached to an axle and hub of a model vehicle, according to an embodiment of the disclosure.
Figure 7:
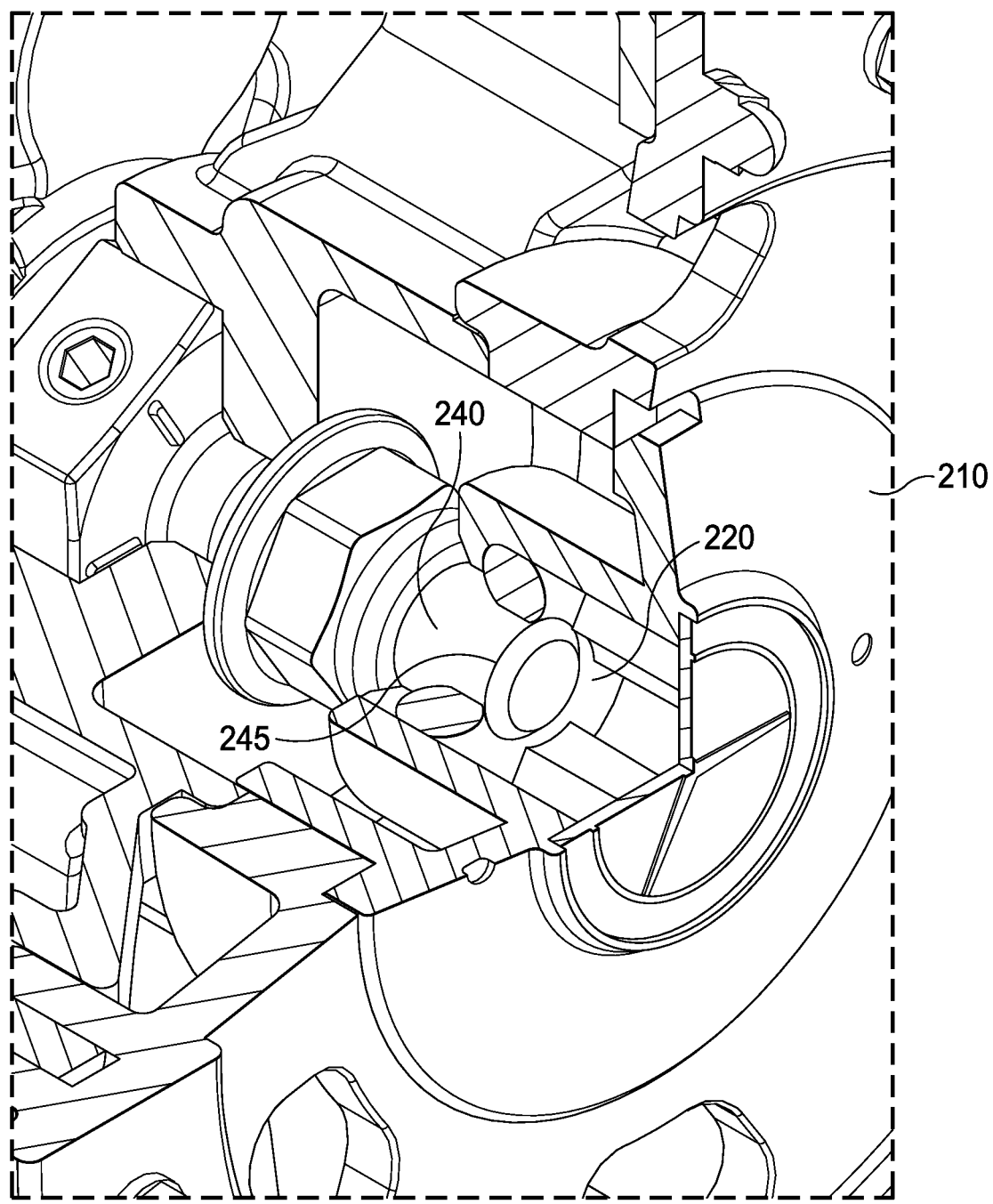
FIG. 7 is an enlarged portion of FIG. 6 showing a hub cap retention mechanism for a wheel assembly of a model vehicle, according to an embodiment of the disclosure.
Figure 8:
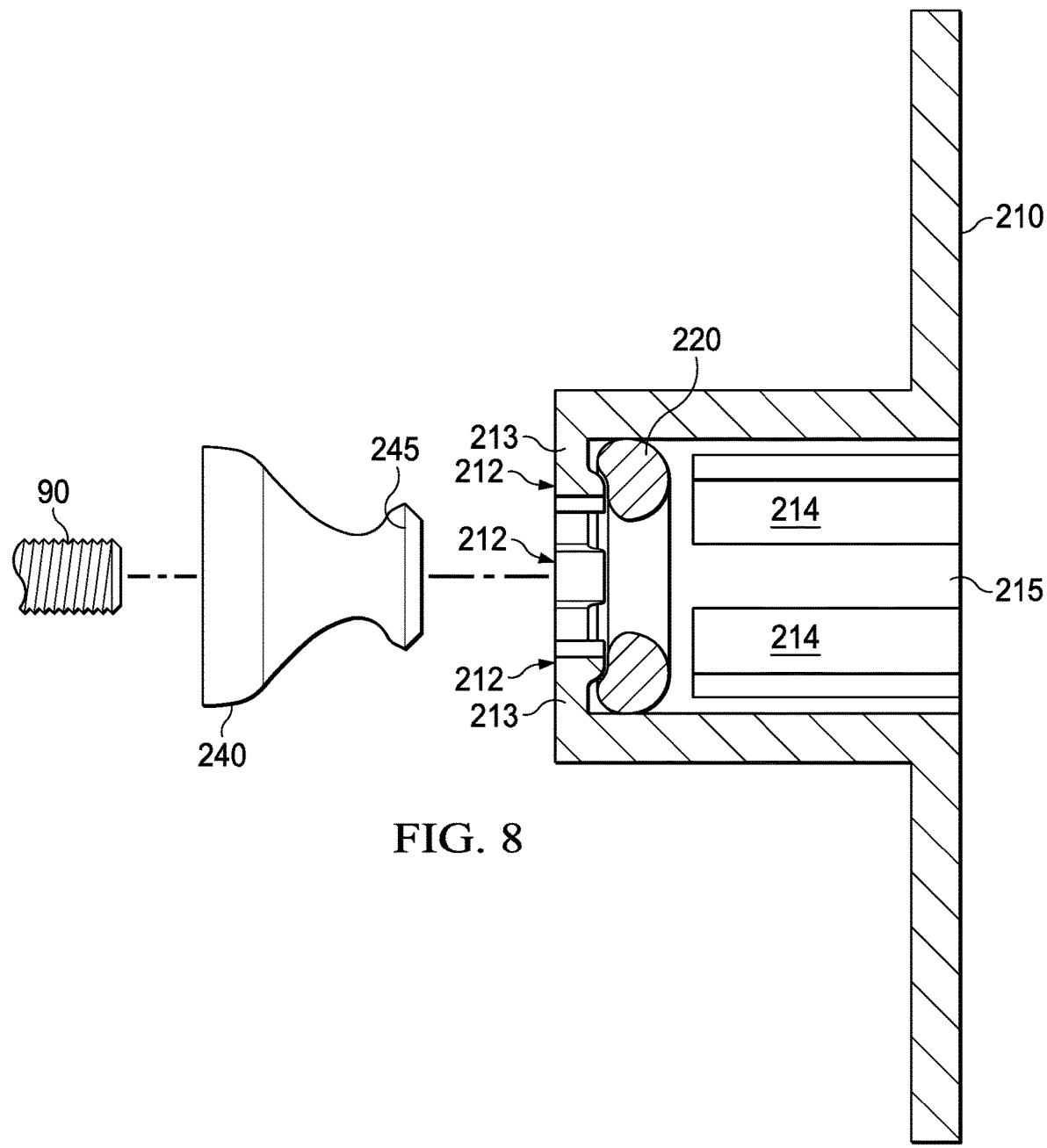
FIG. 8 is a partial sectional assembly view of a hub cap retention mechanism for a wheel assembly of a model vehicle, according to an embodiment of the disclosure.

Referring now generally to FIGS. 1, 6, 7 and 8, a hub cap assembly 200 may be affixed to the wheel assembly 100 to further provide detail and scale realism to an R/C vehicle. As seen in FIG. 6, a completed wheel assembly 100 is removably attached to an axle 90 via a securing bolt 95. The securing bolt 95 in this exemplary embodiment attaches the wheel base 110 to the axle 90. In many applications, the securing bolt 95 is threadably attached to the axle 90.

Next to the securing bolt 90 is an axle end piece 240. In some embodiments, the axle end piece 240 may be treadably attached to the end of axle 90. The axle end piece 240 may completely contain the axle 90 (i.e., the axle end piece may be similar to a closed end cap nut, for example) and may be formed either separately from the securing bolt 95 or may be formed as a single integrated piece with the securing bolt 95. One function of the axle end piece 240 may be to provide an axle end piece retainer holder 245 (most easily seen in FIG. 7 and FIG. 8). The axle end piece retainer holder 245 will removably couple with the retainer 220 allowing the hub cap 210 to be removably secured to the rest of the wheel assembly 100.

For this exemplary embodiment, a hub cap 210 may be provided with a retainer 220 contained within an opening 215 of the hub cap 210. As more easily seen in FIG. 8, a retainer 220 may be removably constrained in one direction by a first retainer support 212. The first retainer support 212 inhibits the retainer 220 from moving in one direction towards the axle 90.

A second retainer support 214 inhibits the movement of the retainer 220 in a second direction, away from the axle 90. In this exemplary embodiment, the first retainer support 212 and the second retainer support 214 are provided in an alternating fashion around the circumference of the hub cap opening 215. The first and second retainer supports 212, 214, alternate to prevent die lock of a mold (not shown) for the hub cap 210.

The first retainer support 212 is shown as arms extending from the hub cap opening 215 in parallel with a center axis of the hub cap 210. At the end of each arm is a perpendicular protrusion 213 extending towards the center axis of the hub cap 210 from a surface of the hub cap opening 215. The second retainer supports 214 are shown as arms or arms with protrusions extending along the center axis of the hub cap 210 and having a thickness that projects towards the center axis of the hub cap 210 from the surface of the hub cap opening 215.

Both the first and second retainer supports 212, 214 function to largely constrain the retainer 220 to a particular location along a center axis of the hub cap 210. The first and second retainer supports 212, 214 may incorporate alternate embodiments as appropriate, as long as the retainer 220 maintains a general location along the central axis of the hub cap 210. For example, the first and second retainer supports 212, 214 may be grooves, separate pieces joined together, adhesive, or other features and components as appropriate.

The retainer 220 is shown in this embodiment as a resilient member (e.g., a rubber o-ring among others). The retainer 220 may also be formed of elastically deformable material, as long as the retainer 220 is able to expand to accommodate the circumference of the axle end piece retainer holder 245, and then substantially rebound to accommodate the slightly smaller circumference past the axle end piece retainer holder 245 in an axial direction. The retainer 220 must also be deformable enough for assembly into the hub cap opening 215 of the hub cap 210.

Although the retainer 220 is shown in this embodiment as a separate member, a retainer 220 may be integrally formed with the hub cap 210 and take advantage of the elastic properties of the hub cap 210 material. For example, if the perpendicular protrusions 213 extended towards the center axis of the hub cap 210 to the extent necessary to provide a snap fit with the axle end piece 240, then a separate retainer 220 would not be required.

Similarly, if the hub cap 210 is made from metal, and the axle end piece retainer holder 245 and axle end piece 240 are made of plastic, the axle end piece retainer holder 245 may be sized to provide a snap fit with an inner opening of the hub cap opening 215. And in cases where both the hub cap 210 and the axle end piece 240 are made of plastic, the resilient deformation of each of these pieces can be used to make a snap fit between the axle end piece retainer holder 245 and an opening of the hub cap opening 215.

The hub cap assembly 200 is shown with a center cover 230 displaying an automobile emblem. However, in other embodiments, the center cover 230 may have a solid outer surface with no additional markings. A center cover 230 may be used in order to provide additional detail or additional surface finishes such as chrome or color options to the rest of the hub cap 210 and wheel assembly 100. The center cover 230 may be installed after the wheel assembly 100 is assembled to an axle 90 and the hub cap 210 is affixed and held in place via the retainer 220.

A removal slot 216 (see FIG. 6) or opening may be present in the outer circumference of the hub cap 210 in order to facilitate removal by the user. In the embodiment shown, a small removal device or standard tool such as a flat-bladed screwdriver, may be inserted into the removal slot 216 to pry the hub cap 210 away from the rest of the wheel assembly 100.

As described, a wheel assembly 100 may be secured to the axle 90 via a securing bolt 95. An axle end piece 240 may then be threadably coupled to the axle 90. A hub cap 210 with a retainer 220 inserted therein may then be pushed along a center axis of the axle 90 into the wheel assembly 100 until held by the retainer 220 and the axle end piece retainer holder 245. Due to the interference between inner diameter of the retainer 220 and the outer diameter of the axle end piece retainer holder 245, the retainer 220 is resiliently deformed during the installation of the hub cap 210 and inhibits removal due to the axle end piece retainer holder 245.

Once fully inserted into the wheel assembly 100, the retainer 220 resiliently constricts the inner diameter of the retainer 220 onto the portion of the axle end piece 240 just below the axle end piece retainer holder 245. Once a portion of the retainer 220 is properly located below the axle end piece retainer holder 245, the interference between the inner diameter of the retainer 220 and the outer diameter of the axle end piece retainer holder 245 as well as the elasticity constant of the retainer 220 material work to removably retain the hub cap 210 in place in the wheel assembly 100.

Figure 9:
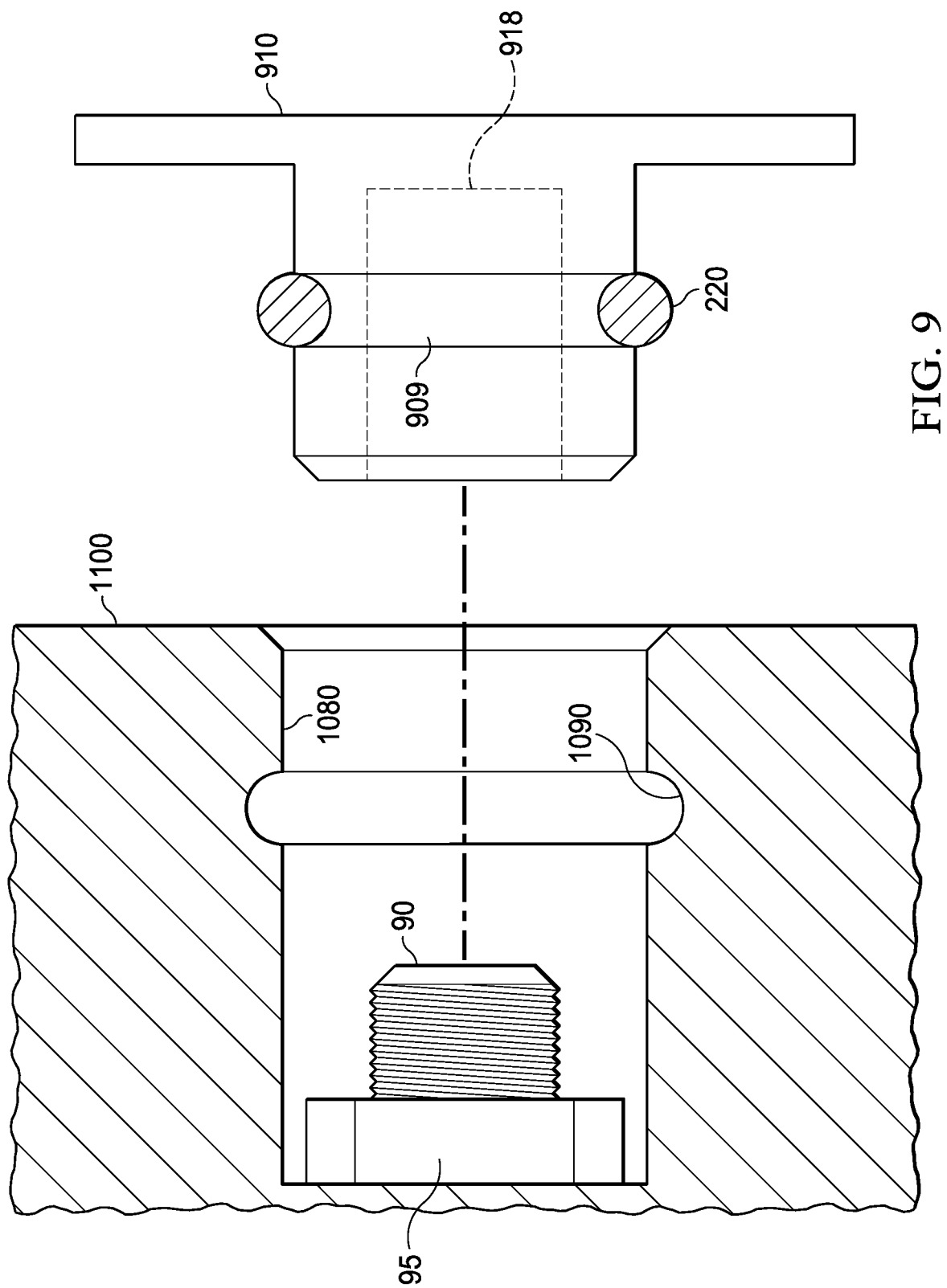
FIG. 9 is a partial sectional view assembly view of a hub cap retention mechanism for a wheel assembly of a model, according to an embodiment of the disclosure.

In the previously described exemplary embodiment, a retainer 220 is used on an inner opening 215 of a hub cap 210. Referring generally to FIG. 9, another embodiment is shown in which the retainer 220 is used on an outer diameter of the hub cap 910. As shown in the figure, a hub cap 910 is assembled to a wheel assembly 1100. The hub cap 910 does not have a separate center cover 230 or a hub cap opening 215 as in the previous embodiment.

The hub cap 910 includes a retainer holder 909 positioned along a center axis of the hub cap 910 and used to secure the retainer 220 at this position. The wheel assembly 1100 has a central opening 1080 including a wheel base retainer holder 1090. The wheel base retainer holder 1090 interacts with the retainer 220 to removably secure the hub cap 910 to the rest of the wheel assembly 110.

In addition, while a separate rubber or resilient o-ring is shown as an embodiment of the retainer 220, but the retainer 220 may also be integrally formed with either the wheel assembly 1100, or integrally with the hub cap 910. Of course, a corresponding retainer holder such as the wheel base retainer holder 1090 should be provided in the mating component. As shown, in this exemplary embodiment the hub cap 910 has a solid outer surface instead of a separate space for a center cover 230 or emblem to be attached.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A wheel assembly for an R/C vehicle comprising:
a wheel base configured for mounting an R/C vehicle tire;
an accent color trim piece provided on a facing surface of the wheel base;
a non-accent color wheel face configured to allow portions of the accent color trim piece to be visible when the wheel face is attached to the wheel base; and
wherein the wheel face has a plurality of circular orifices provided through the wheel face to produce a plurality of accent color circles around a circumference of the wheel assembly.

2. The wheel assembly according to claim 1, wherein the accent color trim piece is a vinyl sheet adhesively attached to the surface of the wheel base.

3. The wheel assembly according to claim 1, wherein the accent color trim piece results from an accent color paint applied to the surface of the wheel base.

4. The wheel assembly according to claim 1, wherein the wheel face has a smaller outer diameter than an outer diameter of the facing surface of the wheel base producing a visible accent colored ring around an outer circumference of the wheel assembly.

5. The wheel assembly according to claim 1, wherein the wheel face is secured to the wheel base via threaded fasteners.

6. The wheel assembly according to claim 1, wherein the wheel face is configured to resemble a bead locking rim.

7. The wheel assembly according to claim 1, wherein the wheel face is configured to accept a hub cap assembly.

8. A wheel assembly for an R/C vehicle comprising:
a wheel base configured to mount an R/C vehicle tire and further comprising;
an accent color trim portion of a facing surface of the wheel base;
a non-accent colored wheel face configured to allow portions of the accent color trim piece to be visible after the wheel face is attached to the wheel base; and
wherein a second accent color trim portion is applied to the accent color trim portion of the facing surface of the wheel base.

9. The wheel assembly according to claim 8, wherein the second accent color trim portion is a vinyl sheet adhesively attached to the accent color trim portion.

10. The wheel assembly according to claim 9, wherein the vinyl sheet comprises a camouflage pattern.

11. The wheel assembly according to claim 8, wherein the wheel face is configured to resemble a bead locking rim.

12. The wheel assembly according to claim 8, wherein the wheel face has a wheel face outer diameter that is less than an accent color trim portion outer diameter.

13. The wheel assembly according to claim 8, wherein the wheel face is configured to accept a hub cap assembly.

14. A wheel assembly for an R/C vehicle comprising:
a wheel base configured for mounting an R/C vehicle tire;
an accent color trim piece provided on a facing surface of the wheel base;
a non-accent color wheel face configured to allow portions of the accent color trim piece to be visible after the wheel face is attached to the wheel base;
a hub cap assembly comprising:
a hub cap; and
a hub cap retainer;
wherein the hub cap assembly is removably secured against the wheel base via the hub cap retainer; and
wherein the hub cap retainer comprises a rubber o-ring.

15. A wheel assembly for an R/C vehicle comprising:
a wheel base configured for mounting an R/C vehicle tire;
an accent color trim piece provided on a facing surface of the wheel base;
a non-accent color wheel face configured to allow portions of the accent color trim piece to be visible after the wheel face is attached to the wheel base;
a hub cap assembly comprising:
a hub cap; and
a hub cap retainer;
wherein the hub cap assembly is removably secured against the wheel base via the hub cap retainer; and
wherein the hub cap retainer removably attaches the hub cap to an axle end piece threadably fastened to an R/C vehicle axle.

16. A wheel assembly for an R/C vehicle comprising:
a wheel base configured for mounting an R/C vehicle tire;
an accent color trim piece provided on a facing surface of the wheel base;
a non-accent color wheel face configured to allow portions of the accent color trim piece to be visible after the wheel face is attached to the wheel base;
a hub cap assembly comprising:
a hub cap; and
a hub cap retainer;
wherein the hub cap assembly is removably secured against the wheel base via the hub cap retainer; and
wherein the hub cap retainer is provided within a hub cap opening between a first retainer support and a second retainer support.

17. The wheel assembly according to claim 14, wherein the wheel face is configured to resemble a bead locking rim.

* * * * *